(12) United States Patent
Eichenhofer et al.

(10) Patent No.: US 11,141,756 B2
(45) Date of Patent: Oct. 12, 2021

(54) GLUE GUN

(71) Applicant: 9T Labs AG, Zürich (CH)

(72) Inventors: Martin Eichenhofer, Deggenhausertal (DE); Florian Eichenhofer, Deggenhausertal (DE)

(73) Assignee: 9T Labs AG, Zürich (CH)

( * ) Notice: Subject to any disclaimer, the term of this patent is extended or adjusted under 35 U.S.C. 154(b) by 353 days.

(21) Appl. No.: 16/317,960

(22) PCT Filed: Jun. 14, 2017

(86) PCT No.: PCT/EP2017/000693
§ 371 (c)(1),
(2) Date: Jan. 15, 2019

(87) PCT Pub. No.: WO2018/019398
PCT Pub. Date: Feb. 1, 2018

(65) Prior Publication Data
US 2019/0224710 A1  Jul. 25, 2019

(30) Foreign Application Priority Data
Jul. 23, 2016 (DE) ................... 10 2016 008 847.8

(51) Int. Cl.
*B05C 17/00* (2006.01)
*B05C 17/005* (2006.01)
*B29C 70/52* (2006.01)

(52) U.S. Cl.
CPC .......... *B05C 17/0053* (2013.01); *B05C 17/00* (2013.01); *B05C 17/00523* (2013.01);
(Continued)

(58) Field of Classification Search
CPC .......... B05C 17/0053; B05C 17/00523; B05C 17/0052; B05C 17/00526; A47L 13/32
(Continued)

(56) References Cited

U.S. PATENT DOCUMENTS 5,026,188 A * 6/1991 Capodieci ........... B05C 17/0053
                                                219/230
5,091,036 A   2/1992 Taylor
(Continued)

FOREIGN PATENT DOCUMENTS

DE   20 2013 007 889 U1   10/2014
EP        0 423 388 A1     4/1991
(Continued)

OTHER PUBLICATIONS

International Search Report of PCT/EP2017/000693, dated Oct. 9, 2017.

*Primary Examiner* — David J Walczak
(74) *Attorney, Agent, or Firm* — Dicke, Billig & Czaja, PLLC

(57) ABSTRACT

A glue gun, comprising: a housing for storing strands including thermoplastic plastic, a heating device, an outlet nozzle for discharging heated strands from the glue gun, an extrusion unit for shaping extruded strand, a conveying device for conveying strands to the heating device and through the outlet nozzle. Embodiments of the disclosure make it possible to store glue in the glue gun even in large amounts and to join the parts to each other with a strand of fiber-reinforced plastic with adhesive bonds in such a way that the adhesive bonds can withstand even large forces. Various glue guns of the disclosure include a pultrusion unit for consolidating fibers and plastic.

20 Claims, 1 Drawing Sheet

(52) U.S. Cl.
CPC ........ *B29C 70/52* (2013.01); *B05C 17/00526* (2013.01); *B05C 17/00536* (2013.01); *B05C 17/00553* (2013.01)

(58) Field of Classification Search
USPC .......................................... 401/1, 2
See application file for complete search history.

(56) References Cited

U.S. PATENT DOCUMENTS

| | | | |
|---|---|---|---|
| 6,558,059 B1 * | 5/2003 | Hillinger | B05C 17/00536 222/146.2 |
| 7,520,408 B1 | 4/2009 | Smith et al. | |
| 9,586,229 B1 | 3/2017 | Lee | |
| 10,046,498 B2 | 8/2018 | Dilworth et al. | |
| 2017/0057149 A1 | 3/2017 | Eichenhofer et al. | |

FOREIGN PATENT DOCUMENTS

| | | |
|---|---|---|
| WO | 2008101455 A2 | 8/2008 |
| WO | 2010/046305 A1 | 4/2010 |
| WO | 2015/169414 A1 | 11/2015 |

* cited by examiner

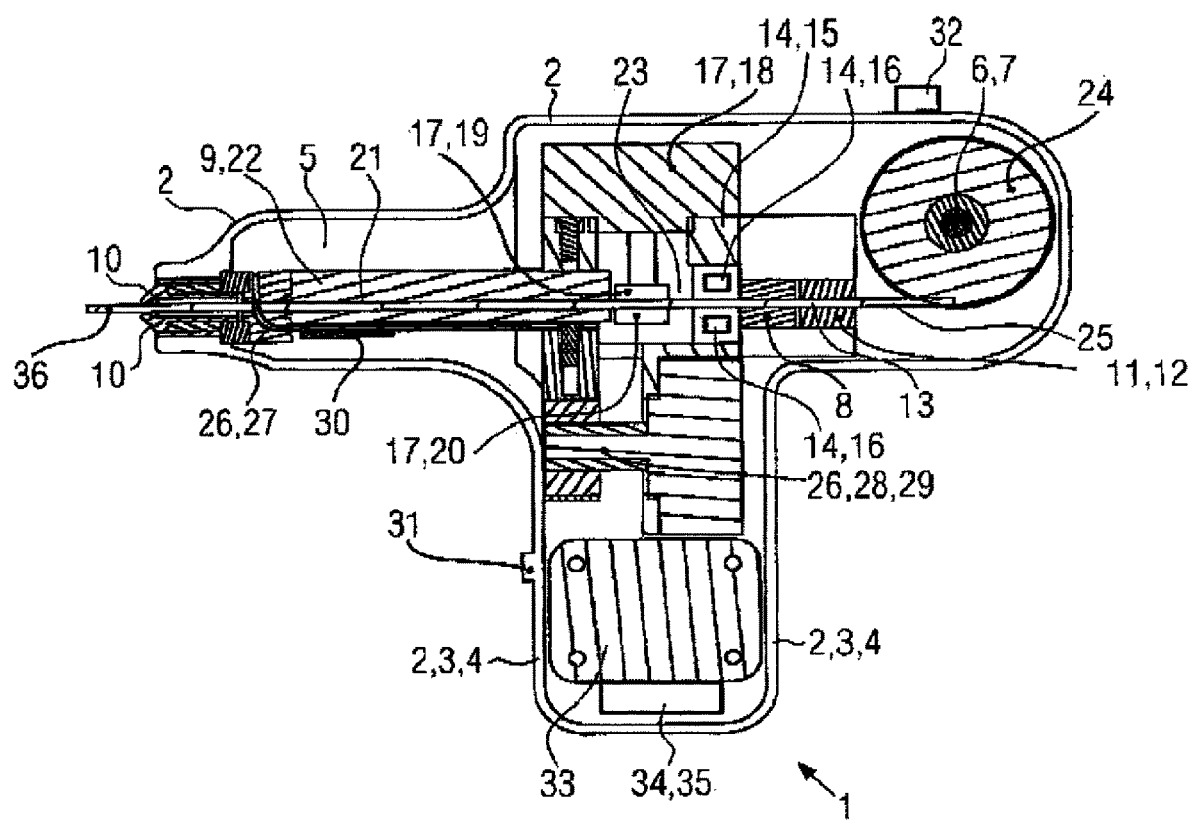

GLUE GUN

CROSS REFERENCE TO RELATED APPLICATIONS

This application is the National Stage of PCT/EP2017/000693 filed on Jun. 14, 2017, which claims priority under 35 U.S.C. § 119 of German Application No. 10 2016 008 847.8 filed on Jul. 23, 2016, the disclosures of which are incorporated by reference. The international application under PCT article 21(2) was not published in English.

The present invention relates to a glue gun according to the preamble of claim 1 and method for operating a glue gun.

Glue guns are used in various technical applications to connect parts together in a to be produced material-locking connection as an adhesive connection. Glue guns have a storage means for storing thermoplastic as a glue. The storage means is for example adapted to store rod-shaped thermoplastic glue on the glue gun. By means of a heating device, the thermoplastic glue is heated and then discharged through an outlet nozzle from the glue gun, so that thereby a strand of the heated thermoplastic glue can be applied to in a material-locking manner to be joined parts. After cooling and hardening of the thermoplastic glue thereby two parts are connected together by means of the adhesive connection. Disadvantageously, it is necessary to refill the rods frequently into the glue gun, because the storage means can only store one rod or only a small number of rods. As a result, the glue gun is not practical to handle, because during long-standing prolonged gluing operations the rod made of thermoplastic glue must be manually refilled. The strand made of thermoplastic glue emerging from the outlet nozzle can also carry only low tensile forces, so that thereby an adhesive connection between two parts, which requires high tensile forces, cannot be produced.

The DE 20 2013 007 889 U1 discloses a hot glue gun with an angular housing, with a first leg—nozzle leg—, which receives a heater for hot melt glue and at one end of it an outlet nozzle for the hot melt glue is arranged, with a handle forming a second leg—handle leg—, with a mounted on the housing, manually operable operating part, with which a feed device is actuated, in particular hot melt glue formed as strands is feeded to the heater, which heats the hot melt glue, so that a liquefied part of the hot melt glue can discharge from the outlet nozzle after heating, and with a stand for in particular upright put down of the hot glue gun on a separate storage area during breaks in use, whereby the stand is arranged at the operating part.

The EP 0 423 388 A1 discloses a glue gun with a guide channel for thermoplastic material, a nozzle for discharging the liquefied plastic and an electrical resistance heating element for melting the plastic, whereby the heating element is arranged directly in the guide channel and in the region of the nozzle.

The object of the present invention is therefore to provide a glue gun and method for operating a glue gun so that it is possible to store glue in the glue gun even in large amounts and to join the parts to each other with a strand of fiber-reinforced plastic by means of adhesive bonds in such a way that the adhesive bonds withstand even large forces.

This object is achieved by a glue gun, comprising: a housing, at least one storage means for storing, preferably thermoplastic or thermosetting, plastic, a heating device, an outlet nozzle for discharging the heated plastic from the glue gun, an extrusion unit for shaping the strand having plastic, which strand is to be extruded, a conveying device for conveying the, preferably thermoplastic or thermosetting, plastic from the storage means to the heating device and through the outlet nozzle, whereby the glue gun comprises a pultrusion unit for consolidating fibers and, preferably thermoplastic or thermosetting, plastic. Due to the construction of the glue gun with a pultrusion unit and an extrusion unit can thereby also fiber-reinforced, preferably thermoplastic or thermosetting, plastic heated as glue at the glue gun and discharged through the outlet nozzle. As a result, the fiber-reinforced, preferably thermoplastic or thermosetting plastic, which has been discharged at the outlet nozzle has a high load capacity with regard to the ability to carry tensile forces. As a result, two parts or components can be connected to one another in a material-locking manner, that the extruded strand of the fiber-reinforced plastic can carry large forces. The consolidation in the pultrusion unit is the material-locking connection of the fibers to the plastic. Preferably, the consolidation additionally causes, that the plastic after consolidation in the pultrusion unit, that is to say the heating of the plastic in the pultrusion unit and the final complete cooling after discharging from the glue gun, is no longer bendable, because optionally the unheated plastic is bendable prior to insertion into the pultrusion unit. The initiation of the hardening process in thermosetting plastic is preferably carried out in that the plastic is heated in the pultrusion unit and/or extrusion unit above a thermal activation temperature, so that after the discharge and complete cooling of the thermosetting plastic from the glue gun, the thermosetting plastic irreversibly hardens. The cooling of the thermosetting plastic between the pultrusion unit and the extrusion unit is carried out so that the thermosetting plastic in the extrusion unit can still be deformed, for example due to low cooling of the thermosetting plastic between the pultrusion unit and the extrusion unit above thermal activation temperature and/or the short time, which the thermosetting plastic requires after cooling between the pultrusion unit and the extrusion unit and until it leaves the extrusion unit, so that the thermosetting plastic hardens only slightly and can still be deformed until it leaves the extrusion unit. In the extrusion unit, the shaping of the strand to be extruded takes place.

In an additional embodiment in the conveying direction of the plastic first the pultrusion unit and afterwards the extrusion unit is designed.

In a further variant the outlet nozzle is designed at the extrusion unit.

Suitably the pultrusion unit comprises a first heating device and the extrusion unit comprises a second heating device.

In an additional embodiment there is a free space between the pultrusion unit and the extrusion unit so that the plastic, after emerging from a pultrusion channel of the pultrusion unit and prior to insertion into an extrusion channel the extrusion unit, is arranged within the free space. After the strand has discharged from the pultrusion unit and before the strand is introduced into the extrusion unit, the strand in the free space can thereby be partially cooled and slightly hardened, so that the strand for example can also be conveyed accordingly by a conveying device.

In an additional embodiment the conveying device is arranged between the pultrusion unit and the extrusion unit, in particular in the free space between the pultrusion unit and the extrusion unit.

In a further variant the conveying device is designed as at least one conveyor roll.

In a further embodiment the conveying device comprises two conveyor rolls for the arrangement of a strand of the plastic between the two conveyor rolls, in particular the distance between the conveyor surfaces of the two conveyor rolls for resting on the strand of the plastic mainly corresponds to the diameter of the pultrusion channel at one end of the pultrusion channel in the conveying direction of the plastic and/or to the diameter of the extrusion channel at a beginning of the extrusion channel in the conveying direction of the plastic. Preferably, the distance between the conveying surfaces, that is, the radial outer sides of the two conveyor rolls or the two conveyor wheels, slightly smaller than the diameter of the strand, so that thereby the conveying surfaces of the conveyor rolls rest with a compressive force on the strand. As a result, a conveying is possible and due to the partially cooled strand on the conveyor rolls, the conveying of the strand can be performed without a corresponding large deformation of the strand, because the strand is already partially hardened due to the partial cooling at the conveyor rollers, but then in the extrusion unit deformation is possible because, for example only in the extrusion unit the thermosetting plastic is heated to the thermal activation temperature for the beginning of the irreversible hardening of the thermosetting plastic.

In an additional embodiment the storage means serves for storing strand-shaped, preferably thermoplastic or thermosetting, plastic rolled on a spool.

The storage means, for example designed as a storage rod, can thus serve to support a coil. On the spool, a large amount of a yarn, in particular a hybrid yarn can be stored, so that even large amounts or lengths of the strand can be discharged from the outlet nozzle, without the necessity of refilling of the glue gun with plastic. The plastic on the spool, which is preferably wound in the form of fibers on the spool, can be bent.

Suitably the glue gun comprises a spool with rolled on strand-shaped unconsolidated, preferably thermoplastic or thermosetting, plastic.

In an additional embodiment the strand-shaped, preferably thermoplastic or thermosetting, plastic is formed as a hybrid yarn with fibers, in particular glass fibers, carbon fibers and/or aramid fibers, and the, preferably thermoplastic or thermosetting, plastic. The hybrid yarn comprises fibers and the, preferably thermoplastic or thermosetting, plastic. As a result, the strand extruded from the outlet nozzle can carry large tensile forces due to the arrangement of the fibers in the extruded strand. Advantageously, two components can thus also be connected to one another in such a way, that large tensile forces can be carried by the extruded strand, which in addition also produces an adhesive connection between the two components. In the hybrid yarn thus fibers and plastic are formed and the plastic is preferably in the form of a strand or fibrous in the hybrid yarn together with the fibers as reinforcing fibers of a material other than plastic to carry large tensile forces. The hybrid yarn may comprise a strand or a fiber or a plurality of strands or a plurality of fibers made of plastic. The diameter of the at least one strand of plastic in the hybrid yarn is preferably smaller than the diameter of the strand of fiber-reinforced plastic to be extruded.

In a further variant the glue gun comprises a cutting unit for severing a strand of plastic, preferably fiber-reinforced plastic. Suitably, the cutting unit is automatically controlled by a control and/or regulating unit, as the conveyor. By means of an activating unit, the glue gun can be switched on and off. In an activated activation unit or an actuated activation unit operation of the conveyor takes place and after a deactivation or a switch off of the activation unit, the conveyor is first automatically switched off and then a severing of the strand is carried out by means of the cutting unit. As far as during the activation of the activation unit, the two heaters not yet have a sufficient temperature, by the control and/or regulating unit with help of the activation of the heating device automatically the extrusion channel and the pultrusion channel are heated to a corresponding necessary temperature and then the activation of the conveyor is implemented.

In a further embodiment the glue gun comprises an activating unit for switching on and off the glue gun, in particular the first and second heating device and/or the conveying device.

In a further embodiment, the glue gun comprises a cooling device for cooling the strand before the introduction of the strand into the extrusion unit. Preferably, the cooling device is formed at the pultrusion unit, in particular on an end region of the pultrusion unit in the conveying direction.

In one variant, the cooling device comprises a conveying means, in particular a fan, a ventilator or a pump, for conveying a cooling fluid, in particular air or liquid. The cooling fluid may, for example, be passed through a cooling channel and heat is transferred from the strand to the cooling fluid in the cooling channel and subsequently heat is transferred from the cooling fluid to the environment, in particular with a heat exchanger. Deviating from this, air can be conveyed to the strand in the free space with a blower for cooling the strand between the pultrusion unit and the extrusion unit. Preferably, the cooling device is disposed within an internal space limited by the housing.

Method according to the invention for operating a glue gun, in particular a glue gun disclosed in this patent application, comprising the steps of: feeding of hybrid yarn with fibers and, preferably thermoplastic or thermosetting, plastic to a pultrusion unit, heating of the hybrid yarn in a pultrusion unit, so that the fibers and the, preferably thermoplastic or thermosetting, plastic are connected to each other in a material-locking manner and the, preferably thermoplastic or thermosetting, plastic is consolidated, cooling the strand of fibers and plastic after heating in the pultrusion unit, feeding the cooled strand of fibers and plastic into an extrusion unit, heating of the cooled strand of fibers and plastic in the extrusion unit, forming the cross-sectional shape of the strand of fibers and plastic in the extrusion unit and discharging the strand of fibers and plastic at an outlet nozzle of the extrusion unit.

Suitably the strand of fibers and plastic is cooled in a free space between the pultrusion unit and the extrusion unit and/or is cooled by a cooling device.

In a further embodiment, the first heating device and/or the second heating device is an electrical resistance heater. Preferably, the pultrusion channel and/or a tube for limiting the pultrusion channel can be heated with the first heating device. Preferably, with the second heating device of the extrusion channel and/or a tube for limiting the extrusion channel can be heated.

In one variant, the glue gun comprises at least one heating device.

In a further embodiment, the conveying device is driven by a motor, in particular an electric motor. Preferably, the glue gun comprises a motor, in particular an electric motor, for driving the conveying device.

Suitably, the storage means is a rod for supporting a spool.

In a further embodiment, the cutting unit is designed as a cutting stub.

In a further variant, the cutting unit can be moved by means of a powering device, in particular an electric motor or electromagnet.

In a further embodiment, the glue gun comprises a vibration motor for displacing the cutting unit into a vibrating or rattling motion.

In an additional embodiment, the glue gun comprises an actuator for controlling and/or regulating the feed rate of the strand in the pultrusion unit and/or extrusion unit, in particular the conveying device can be controlled and/or regulated with the actuator.

In a further variant, the glue gun comprises a power supply unit, in particular a battery or a fuel cell.

Preferably, the glue gun comprises a control and/or regulating unit for controlling and/or regulating the glue gun.

In an additional variant, the outlet nozzle is detachable, preferably with a positive and/or frictional connection, in particular a clip or snap connection, attached to the remaining glue gun, in particular the extrusion unit, so that outlet nozzles with different cross-sectional shapes can be fastened to the glue gun. The different cross-sectional shapes are, for example, a circle, a triangle, a rectangle, in particular a square. Thus, adhesive strands with these cross-sectional shapes can be extruded from the glue gun.

In a further embodiment, the glue gun comprises a plurality of storage means. Therefore, several spools can be stored on the glue gun.

In a further variant, the at least one storage means, in particular all storage means, are arranged within an internal space limited by the housing.

Preferably, the at least one spool, in particular all spools, are arranged within an internal space limited by the housing.

In a further embodiment, the first heater and the second heater are formed at a distance from each other, in particular the distance is at least 0.5 cm, 1 cm, 2 cm, 3 cm or 5 cm.

In a supplementary embodiment, a method described in this patent application for the operation of the glue gun can be carried out with the glue gun.

In an additional embodiment, the glue gun, in particular the housing of the glue gun, has an arbitrary shape. The shape of the glue gun can thus also be a different shape than a pistol. Preferably, the glue gun has a holding section for manually holding or gripping the glue gun.

In a further embodiment, for the production of the strand the pultrusion is carried out as the first step and as a second step the extrusion is carried out, so that the pultruded strand partially produced in the first step is post-processed in the second step with extrusion.

Advantageously, hybrid yarns with fibers and plastic as a matrix are conveyed to the pultrusion unit.

The strand is made, so that between the fibers the plastic is arranged as the matrix. In the strand, the fibers are strongly connected to each other with the matrix by a material-locking connection, because the matrix hardens after discharging form the glue gun. The fibers are preferably also arranged on the outside of the extruded strand, so that on the outside of the strand, the fibers are visible or tangible. In particular, the fibers are thus not arranged in an inner region of the strand and the matrix in an outer cover. Rather, the fibers and the plastic as the matrix are distributed on the cross-sectional shape and between the fibers and the matrix is arranged. A strand preferably comprises for example at least two, three, five or ten fibers.

In a further embodiment, in the pultrusion unit during the pultrusion by means of the matrix the fibers are connected in a material-locking manner together, in particular by heating and/or hardening the matrix and/or the matrix is cooled during conveying from the pultrusion unit to the extrusion unit, so that the fibers are connected to one another in a material-locking manner and/or the fibers and the matrix are conveyed by means of a conveying device, for example with two conveyor rolls, in particular as the conveying device is acting onto the fibers with the matrix during the conveying of the fibers with the matrix from the pultrusion unit to the extrusion unit and/or the fibers and the matrix first are connected to one another in a material-locking manner by means of pultrusion, in particular by heating and/or hardening of the matrix, and then the cross-sectional shape of the rods is formed during extrusion in the extrusion unit and/or the rods are produced with a maximum diameter between 1 mm and 30 mm, in particular between 2 mm and 20 mm.

In a further embodiment in the pultrusion unit the fibers with the matrix are first heated, during the conveying of the fibers with the matrix from the pultrusion unit to the extrusion unit the fibers cool down and in the extrusion unit the fibers with the matrix are reheated In a further embodiment in the pultrusion unit the fibers made of another material than plastic are connected in a material-locking manner to the plastic.

In a further embodiment the strand is produced so that the mass fraction or volume fraction of the fibers is at least 30%, 40%, 60% or 80% and/or the strand is produced so that the mass fraction or volume fraction of the matrix is less than 70% %, 60%, 40% or 20%, and/or the strand is made so that the strand is formed exclusively from the fibers and the matrix.

In a supplementary embodiment, the strand is produced, so that the length of the fibers, in particular of all the fibers, corresponds in each strand mainly to the length of the strand. Mainly means that the length of the strand corresponds to a deviation of less than 30%, 20%, 10% or 5% to the length of the fibers in the respective strand.

An embodiment of the invention is described in more detail below with reference to the accompanying drawings.

It shows:

FIG. 1 shows a simplified longitudinal section of a glue gun.

The glue gun 1 comprises a housing 2 made of metal and/or plastic and the housing 2 limits an internal space 5. The housing 2 also forms a handle 4 as a holding section 3. A battery 35 as an energy supply unit 34 supplies the glue gun 1 with electric power. An electronic control and/or regulating unit 33 controls and/or regulates the operation of the glue gun 1.

A pultrusion unit 8 and an extrusion unit 9 are arranged inside the internal space 5. In the pultrusion unit 8, a pultrusion channel 13 is designed, and in a right to left direction as shown in FIG. 1, the pultrusion channel 13 initially has a conical tapered section (not shown) and then a section with a constant diameter. At the pultrusion channel 13 in the section with the constant diameter in a direction as shown in FIG. 1 from right to left and in a conveying direction of hybrid yarns 25 and the strand 36 to be produced is first arranged a first heating device 12 and then a cooling device 14. A cooling channel 16 is designed at the cooling device 14, through which a cooling fluid, namely air, is passed by means of a blower 15 for cooling the partially produced strand 36. The glue gun 1 can also be designed without the cooling device 14 and the cooling of the strand 36 takes place within a free space 23 between the pultrusion unit 8 and the extrusion unit 9.

The extrusion unit 9 comprises an extrusion channel 21 and the extrusion channel 21 comprises a first conical tapered section (not shown) and a second section with a constant diameter. At the second portion of the extrusion channel 21 with the constant diameter a second heating device 22 is designed. The first and second heating devices 12, 22 are preferably designed as an electrical resistance heating device 11. In the conveying direction of the strand 36 to be produced through the extrusion channel 21, first the conical tapered section of the extrusion channel 21 and then the section of the extrusion channel 21 with the constant diameter are designed. Between the pultrusion unit 8 and the extrusion unit 9 in the free space 23 a conveying device 17 is formed. The conveying device 17 comprises a first conveyor roll 19 and a second conveyor roll 20, which are driven by an electric motor 18. The partially produced strand 36 is arranged between the two conveyor rolls 19, 20, so that the partially produced strand 36 is with the conveying device 17 pulled out from the pultrusion unit 8 and is with the conveying device 17 pushed into the extrusion unit 9.

The pultrusion unit 8 and the extrusion unit 9 are connected to one another by a connecting part, for example the housing 2. At the housing 2 is fixed a storage means 6 as a storage rod 7. A spool 24 is mounted at the storage rod 7 or storage stub 7 and a hybrid yarn 25 is wound up or rolled up on the spool 24. The hybrid yarn 25 consists of fibers as glass fibers and further comprises the matrix of an unconsolidated thermoplastic. The matrix as the thermoplastic material is arranged in the hybrid yarn 25 as a preferably fibrous or strand-shaped matrix or as a matrix fiber or a matrix strand. The hybrid yarn 25 is bendable and thus can be unrolled from the spool 24.

A cutting device 26 serves to cut off the strand 36 extruded at the extrusion unit 9. The cutting device 26 includes a moveable, bendable cutting stub 27 and the cutting stub 27 is supported with a bearing channel or a bearing tube and is moved by an electric motor 29 as a powering device 28 for the cutting device 26 within the bearing channel. The bearing channel is also partially curved and between the bearing channel and the extrusion channel 21 is an intersection designed, so that the cutting stub 27 can also be inserted into the extrusion channel 21 for severing the strand 36. A vibration motor 30 displaces the cutting unit 26 during the severing of the strand 36 into a vibrating or rattling motion, so that thereby the process of severing is improved. Deviating from this, the cutting device 26 may also be designed at an outlet nozzle 10 (not shown).

During the production of the strand 36 of the composite material with the glass fibers and thermoplastic as glue, the composite material as shown in FIG. 1 is first conveyed through the pultrusion unit 8 and then through the extrusion unit 9 by means of the conveying device 17, but both processes occur due to length of the strand 36 and the distance between the pultrusion unit 8 and the extrusion unit 9 as a whole at the same time, but with respect to a fictitious point on the strand 36 concerning time one after another. Thus, during conveyance of the composite material, the hybrid yarn 25 is rolled from the spool 24 and inserted into the conical tapered portion of the pultrusion channel 13. At the second section of the pultrusion channel 13 with the constant diameter, the hybrid yarn 25 is heated with the first heating device 12, so that the thermoplastic as the matrix melts and the glass fibers are connected in a material-locking manner to each other by the matrix as the thermoplastic as pultrusion process. Subsequently, the composite material with the fibers and the thermoplastic material is conveyed or moved to the section of the pultrusion channel 13 with the cooling device 14, so that thereby the composite material with the glass fibers and the thermoplastic material is cooled and thereby partially hardened.

After the composite material of fibers and the thermoplastic material discharges, the composite material as the strand 36, which has already been partially produced, is conveyed by the conveying device 17 into the extrusion unit 9. Due to the cooling of the composite material with the fibers in the cooling device 14, the composite material can be conveyed by the conveying device 17. In the extrusion unit 9 at the portion of the extrusion channel 21 with the constant diameter the composite material with the fibers and the thermoplastic material is again slightly heated by the second heating device 22 so far that in the conveying direction at the end of the extrusion channel 21 and respectively the outlet nozzle 10, the final shaping of the cross-sectional shape of the strand 36 to be produced is formed. The left end of the extrusion channel 21 in FIG. 1 and respectively the outlet nozzle 10 has a circular cross-sectional shape, thereby producing a strand 36 having a circular cross-section. This strand 36 is not bendable after cooling, because the thermoplastic is consolidated. Due to the temperature of the strand 36 after discharging the exit nozzle 10, the thermoplastic material takes effect as a glue, that is to say a material-locking connection between the extruded and still at a high temperature strand 36 and a component in the environment can be made easy.

An activating unit 31, for example a pushbutton, is used to switch the glue gun 1 on and off. The activating unit 31 is by means of data lines (not shown) connected to the control and/or regulating unit 33. The control and/or regulating unit 33 controls the conveying device 17, the first heating device 12 and the second heating device 22 and the cooling device 14 automatically. By means of temperature sensors, not shown, the temperature in the pultrusion channel 13 and the extrusion channel 21 can be detected. Upon actuation of the activation unit 31 is first checked by the control and/or regulating unit 33, whether the temperature in the pultrusion channel 13 and the extrusion channel 21 is sufficient for melting of the thermoplastic material. If the temperature is insufficient, the pultrusion channel 13 and the extrusion channel 21 are first heated to the required temperature by means of the first heating device 12 and the second heating device 22, and then the conveying device 17 is activated. If the temperature at the pultrusion channel 13 and the extrusion channel 21 is sufficient for the melting of the thermoplastic material, activation of the conveying device 17 takes place immediately after activation of the activating unit 31. After releasing or deactivating of the activating unit 31, the conveying device 17 is switched off and the cutting device 26 is activated as well as preferably the vibration motor 30 is activated. On the housing 2, an actuator 32 is additionally designed. By means of the actuator 32, the conveying speed of the strand 36 can be controlled and/or regulated by the conveying device 17.

Overall, significant advantages are associated with the glue gun 1 according to the invention and the method according to the invention for operating the glue gun 1. On the spool 24, a large amount of thermoplastic material can be stored at the glue gun 1, because the hybrid yarn 25 is space-saving rolled up on the spool 24. Due to the use of the hybrid yarn 25 with fibers, particularly glass fibers, and the thermoplastic as a thermoplastic glue, the strand 36 of composite material can be extruded from the outlet nozzle 10. This composite material has a very high tensile strength due to the arrangement of the fibers between the thermoplastic material. As a result, by means of the strand 36, it is also possible for components to be joined to one another in a material-locking manner, in which case it is necessary that the adhesive connection formed by the strand 36 can also carry high tensile forces. The strand 36 can thus be used not only for the simple production of an adhesive connection between two components, but is also able to produce adhesive connections with a high tensile strength. In addition, by means of the strand 36, corresponding reinforcing structures can thus also be formed on already existing components. The use of the glue gun 1 is thus significantly improved in handling and also makes it possible to extend the field of application of the glue gun 1 to additional applications for the requirement of high tensile forces at the adhesive connections by means of the strand 36.

The invention claimed is:

1. A glue gun for a strand including a thermoplastic having a melting temperature, comprising:
   a heating device,
   a pultrusion unit having a pultrusion channel for consolidating the strand,
   a conveying device configured to convey the strand in a conveying direction,
   an extrusion unit having an extrusion channel for extruding and shaping the strand,
   an outlet nozzle for discharging the strand from the glue gun,
   a pultrusion channel temperature sensor,
   an extrusion channel temperature sensor, and
   an activating unit connected to a control unit, the activating unit configured to control the heating device and the conveying device, and for receiving inputs from the pultrusion channel temperature sensors and the extrusion channel temperature sensor,
   wherein the control unit is configured to activate the conveying device if a first temperature in the pultrusion channel and a second temperature in the extrusion channel are sufficient for melting the thermoplastic plastic.

2. The glue gun according to claim 1, wherein, in the conveying direction of the strand, the pultrusion unit is arranged before the extrusion unit.

3. The glue gun according to claim 1, wherein the outlet nozzle is arranged at the extrusion unit.

4. The glue gun according to claim 1, wherein the pultrusion unit comprises a first heating device of the heating device and the extrusion unit comprises a second heating device of the heating device.

5. The glue gun according to claim 1, wherein there is a free space between the pultrusion unit and the extrusion unit so that the strand, after emerging from the pultrusion channel of the pultrusion unit and prior to insertion into the extrusion channel of the extrusion unit, is arranged within the free space.

6. The glue gun according to claim 1, wherein the conveying device is arranged between the pultrusion unit and the extrusion unit.

7. The glue gun according to claim 1, wherein the conveying device comprises at least one conveyor roll.

8. The glue gun according to claim 7, wherein the conveying device comprises two conveyor rolls for arrangement of the strand between the two conveyor rolls.

9. The glue gun according to claim 1, further comprising a spool for storing the strand.

10. The glue gun according to claim 1, wherein the glue gun comprises a spool including one of a rolled-on strand-shaped unconsolidated thermoplastic or thermosetting plastic.

11. The glue gun according to claim 10, wherein the strand-shaped thermoplastic or thermosetting plastic is formed as a hybrid yarn comprising one or more of a glass fiber, a carbon fiber, and an aramid fiber, and the thermoplastic or thermosetting, plastic.

12. The glue gun according to claim 1, wherein the glue gun comprises a cutting unit for severing the strand.

13. The glue gun according to claim 1, wherein the activating unit for is further configured for switching off one or more of the heating device and the conveying device.

14. The glue gun according to claim 1, further comprising a cooling device between the pultrusion unit and the extrusion unit.

15. The glue gun according to claim 1, further comprising a motorized cutting unit.

16. A method for operating a glue gun, the glue gun comprising:
   a heating device,
   a pultrusion unit comprising a pultrusion channel for consolidating a strand including thermoplastic plastic having a melting temperature,
   a conveying device for conveying the strand in a conveying direction from the heating device and through an outlet nozzle for discharging the strand from the glue gun,
   an extrusion unit comprising an extrusion channel for shaping the strand, which strand is to be extruded,
   a pultrusion channel temperature sensor,
   an extrusion channel temperature sensor, and
   an activating unit connected to a control unit for controlling the heating device and the conveying device and for receiving inputs from the pultrusion channel temperature sensor and the extrusion channel temperature sensor;
   the method comprising:
   feeding the strand to the pultrusion unit,
   heating the strand in the pultrusion unit,
   conveying the strand by the conveying device from the pultrusion unit to the extrusion unit,
   heating the strand in the extrusion unit,
   detecting a first temperature in the pultrusion channel and a second temperature in the extrusion channel, and
   forming a cross-sectional shape of the strand in the extrusion unit;
   wherein conveying the strand by the conveying device is activated upon activation of the activating unit if the first temperature detected in the pultrusion channel and the second temperature detected in the extrusion channel are sufficient for melting the thermoplastic plastic.

17. The method according to claim 16, further comprising cooling the strand between the pultrusion unit and the extrusion unit.

18. The method according to claim 16, wherein the strand comprises a fiber.

19. The method according to claim 18, wherein a material of the fiber is selected from the group consisting of: a glass, a carbon, and an aramid.

20. The method according to claim 16, wherein the glue gun further comprises a motorized cutting unit, and further comprising a step of switching off the conveying device and activating the motorized cutting unit after the activating unit is deactivated.

* * * * *